US012749754B2

(12) United States Patent
Zhang et al.

(10) Patent No.: US 12,749,754 B2
(45) Date of Patent: Sep. 29, 2026

(54) WATERPROOF ASSEMBLY OF ENERGY STORAGE DEVICE, AND ENERGY STORAGE DEVICE

(71) Applicant: CONTEMPORARY AMPEREX TECHNOLOGY (HONG KONG) LIMITED, Hong Kong (CN)

(72) Inventors: Hua Zhang, Ningde (CN); Haoran Peng, Ningde (CN); Long Li, Ningde (CN); Xiaogang Lian, Ningde (CN); Zengzhong Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 252 days.

(21) Appl. No.: 18/599,244

(22) Filed: Mar. 8, 2024

(65) Prior Publication Data

US 2024/0250364 A1 Jul. 25, 2024

Related U.S. Application Data

(63) Continuation of application No. PCT/CN2022/129373, filed on Nov. 2, 2022.

(30) Foreign Application Priority Data

Nov. 25, 2021 (CN) ........................ 202122918062.9

(51) Int. Cl.
*H01M 50/24* (2021.01)
*H01M 50/209* (2021.01)
(Continued)

(52) U.S. Cl.
CPC ......... *H01M 50/24* (2021.01); *H01M 50/209* (2021.01); *H01M 50/298* (2021.01); *H02G 15/013* (2013.01)

(58) Field of Classification Search
CPC .. H01M 50/24; H01M 50/209; H01M 50/298; H02G 15/013
See application file for complete search history.

(56) References Cited

U.S. PATENT DOCUMENTS 3,829,332 A 8/1974 Iizuka et al.
5,399,103 A 3/1995 Kuboshima et al.
(Continued)

FOREIGN PATENT DOCUMENTS

CN 109149294 A * 1/2019 ............. H01R 13/68
CN 208336638 U 1/2019
(Continued)

OTHER PUBLICATIONS

Pai et al. (CN109149294 (A) and using Machine Translation as English version) (Year: 2019).*
(Continued)

*Primary Examiner* — Wyatt P Mcconnell
*Assistant Examiner* — Joshua P Mcclure
(74) *Attorney, Agent, or Firm* — XSENSUS LLP

(57) ABSTRACT

The present application provides a waterproof assembly of an energy storage device, and an energy storage device. The waterproof assembly includes a boss and a wire harness cover. The boss is arranged on an outer wall of a case of a battery, and includes a first outward protruding portion that defines a first through hole in communication with the interior of the case. The wire harness cover is configured to be of a hollow cavity structure for receiving a wire harness, and is internally provided with a first recess that is configured to accommodate the first outward protruding portion to communicate the first through hole with the hollow cavity.

20 Claims, 9 Drawing Sheets

(51) Int. Cl.
*H01M 50/298* (2021.01)
*H02G 15/013* (2006.01)

(56) References Cited

U.S. PATENT DOCUMENTS

2003/0017739 A1* 1/2003 Sawayanagi ....... H01R 13/5202 439/357
2012/0114998 A1 5/2012 Hwang
2013/0052501 A1* 2/2013 Oyama ............... H01M 50/249 429/96
2015/0101842 A1* 4/2015 Han ..................... H02G 15/013 174/50.57

FOREIGN PATENT DOCUMENTS

CN 208596728 U 3/2019
CN 212461896 U 2/2021
CN 113659293 A 11/2021
CN 216529216 U 5/2022
JP 2001-135289 A 5/2001

OTHER PUBLICATIONS

International Search Report mailed on Jan. 20, 2023, received for PCT Application PCT/CN2022/129373, filed on Nov. 2, 2022, 07 pages including English Translation.
Extended European Search Report issued Mar. 3, 2025 in European Patent Application No. 22897568.6.

* cited by examiner

WATERPROOF ASSEMBLY OF ENERGY STORAGE DEVICE, AND ENERGY STORAGE DEVICE

CROSS-REFERENCE TO RELATED APPLICATIONS

The present application is a Continuation of International Application No. PCT/CN2022/129373, filed on Nov. 2, 2022, which claims the priority to Chinese Patent Application no. 202122918062.9, filed on Nov. 25, 2021 and entitled "WATERPROOF ASSEMBLY OF ENERGY STORAGE DEVICE, AND ENERGY STORAGE DEVICE", each of which is incorporated in the present application by reference in its entirety.

TECHNICAL FIELD

The embodiments of the present application relate to the technical field of energy storage, and in particular to a waterproof assembly of an energy storage device, and an energy storage device.

BACKGROUND ART

Since there is a wide market demand for clean energy, energy storage devices are widely used. However, since most production apparatuses for clean energy, such as wind energy, photovoltaic power and tidal energy, are in the wild, the energy storage devices are also usually placed in the open air. On rainy days, rainwater easily enters the energy storage devices, which may damage the function of the energy storage devices or even cause dangerous accidents such as electric leakage. Therefore, how to enhance the rainproof performance of energy storage devices has become an urgent problem to be solved.

SUMMARY OF THE DISCLOSURE

Technical Problem

In view of the problem regarding the rainproof performance, in the embodiments of the present application, a waterproof assembly of an energy storage device, and an energy storage device are provided, which can improve the rainproof performance of the energy storage device.

Solutions to Problems

Technical Solutions

In view of the problem mentioned above, in the embodiments of the present application, a waterproof assembly of an energy storage device, and an energy storage device are provided, which can improve the rainproof performance of the energy storage device.

In a first aspect of the present application, a waterproof assembly of an energy storage device is provided. The waterproof assembly includes a boss and a wire harness cover. The boss is arranged on an outer wall of a case of a battery, and includes a first outward protruding portion that defines a first through hole in communication with the interior of the case. The wire harness cover is configured to be of a hollow cavity structure for receiving a wire harness, and is internally includes a first recess that is configured to accommodate the first outward protruding portion to communicate the first through hole with the hollow cavity.

In an embodiment of the present application, the first outward protruding portion is in interference-fit with the first recess in an axial direction of the boss. The interference-fit connection is simple in structure, has little weakening effect on the strength of the first outward protruding portion and the first recess, and has good impact resistance. Since an outer side wall of the first outward protruding portion is in interference-fit with an inner wall of the first recess, the sealing performance of the wire harness cover to the boss is greatly improved.

In an embodiment of the present application, the boss includes a first end and a second end. The first end is connected to a side wall of the case. The second end is arranged opposite the first end, and is provided with the first outward protruding portion. A second recess is formed between the first end and the first outward protruding portion, and is configured to accommodate a portion of the wire harness cover when the first outward protruding portion is accommodated in the first recess. According to this solution, the sealing performance of the wire harness cover to the boss can be improved.

In an embodiment of the present application, the wire harness cover includes a mouth portion, a tail portion and a transition portion. The mouth portion is located at one end of the wire harness cover connected to the boss, and is provided with an opening through which the first outward protruding portion enters the hollow cavity of the wire harness cover. The tail portion is located at the other end of the wire harness cover, and includes a second through hole through which the wire harness enters the hollow cavity of the wire harness cover. The transition portion connects the mouth portion with the tail portion, and the outer diameter of one end of the transition portion connected to the mouth portion is greater than the outer diameter of one end of the transition portion connected to the tail portion. According to this solution, the volume of the tail portion may be reduced, and accordingly, the wire harness cover occupies less volume of the energy storage device, thereby increasing the energy density of the energy storage device.

In an embodiment of the present application, the mouth portion includes an opening section and a connecting section. The opening section is located at one end of the mouth portion connected to the boss. The connecting section is located at the other end of the mouth portion and configured to connect the opening section with the transition portion. The inner diameter of the connecting section is greater than the inner diameter of the opening section, and the opening section, the connecting section and the transition portion jointly form the first recess.

In an embodiment of the present application, the boss further includes a second outward protruding portion. The second outward protruding portion is located in the second recess, and the second outward protruding portion and the first outward protruding portion form a third recess that is configured to accommodate at least a portion of the opening section when the first outward protruding portion is accommodated in the first recess, the at least a portion of the opening section being in interference-fit with the third recess. According to this solution, the sealing performance of the wire harness cover to the boss can be further improved.

In an embodiment of the present application, a portion of the opening section in contact with the second outward protruding portion is provided with a third outward protruding portion extending toward the first end. The second outward protruding portion is provided with a fourth recess matching the third outward protruding portion. According to this solution, the sealing performance of the wire harness cover to the boss can be further improved.

In an embodiment of the present application, the tail portion includes a bent tail pipe. An inner cavity of the bent tail pipe is in communication with the second through hole. According to this solution, the rainproof performance of the wire harness cover can be enhanced.

In an embodiment of the present application, the material of the wire harness cover includes rubber. According to this solution, the sealing performance of the wire harness cover can be improved.

In a second aspect of the present application, an energy storage device is provided, which includes a battery, a wire harness, and any waterproof assembly provided in the first aspect of the present application. The waterproof assembly is used to implement a waterproof function at a connection between the wire harness and the battery. The energy storage device provided in the second aspect of the present application has a feature of good rainproof effect.

The above description is only an overview of the technical solutions of the present application. In order to more clearly understand the technical means of the present application to implement same according to the contents of the description, and in order to make the above and other objectives, features and advantages of the present application more obvious and understandable, the specific implementations of the present application are exemplarily described below.

BENEFICIAL EFFECTS OF THE DISCLOSURE

Beneficial Effects

In the waterproof assembly of an energy storage device provided in the first aspect of the present application, a battery case is provided with a boss having an outward protruding portion, and a wire harness cover is internally provided with a recess in which the outward protruding portion can be accommodated. In this way, the wire harness cover can encase the portion connected to the boss, so as to prevent rainwater from directly flowing into the wire harness cover or the battery case, thereby enhancing the rainproof performance of the wire harness cover.

BRIEF DESCRIPTION OF THE DRAWINGS

Various other advantages and benefits will become obvious to those of ordinary skill in the art upon reading the following detailed description of preferred implementations. The accompanying drawings are merely for the purpose of illustrating the preferred implementations, and should not be construed as limiting the present application. Moreover, like components are denoted by like reference signs throughout the accompanying drawings. In the drawings.

REFERENCE SIGNS IN THE DETAILED DESCRIPTION OF EMBODIMENTS

Figure 1:
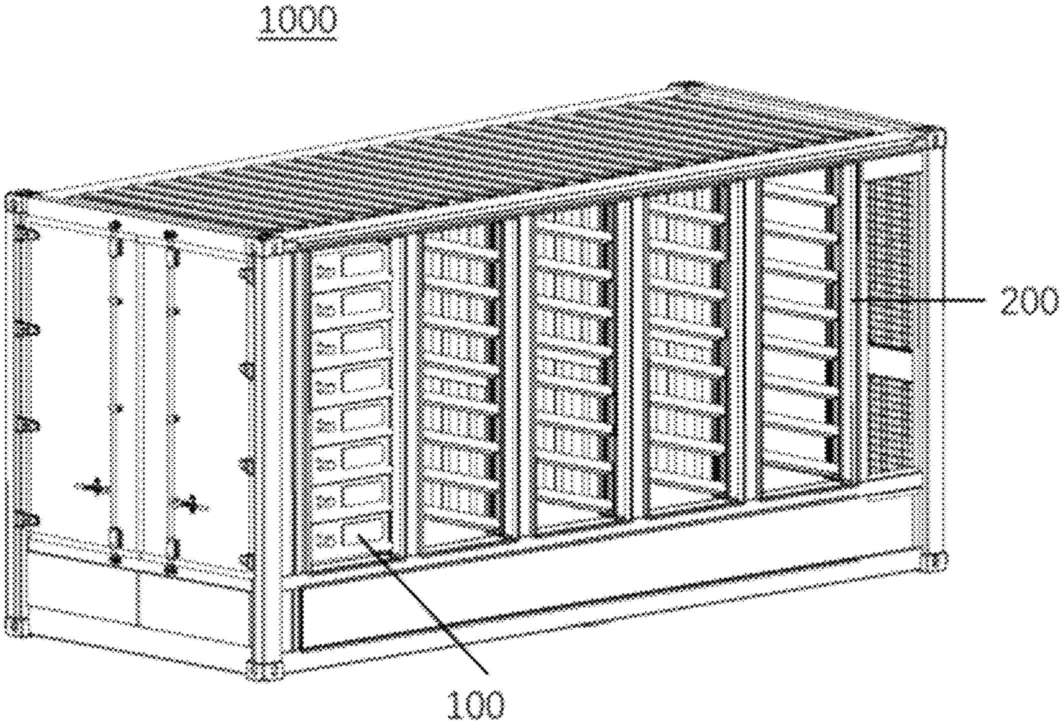
FIG. 1 is a schematic structure diagram of an energy storage device according to some embodiments of the present application.

1000 energy storage device; 100 battery, 200 cabinet frame, 300 wire harness; 10 case, 11 first portion, 12 second portion; 20 battery cell, 21 electrode assembly, 22 shell, 23 end cap; 30 wire harness cover, 31 mouth portion, 310 opening, 311 opening section, 312 connecting section, 313 third outward protruding portion, 32 transition portion, 33 tail portion, 331 bent tail pipe, 301 first recess, 302 second through hole; 40 boss, 40*a* first end, 40*b* second end, 41 first outward protruding portion, 42 second outward protruding portion, 401 first through hole, 402 second recess, 403 third recess, 404 fourth recess.

EMBODIMENTS OF THE DISCLOSURE

Detailed Description of Embodiments

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms “including” and “having” and any variations thereof in the specification and the claims of the present application as well as the brief description of the drawings described above are intended to cover non-exclusive inclusion.

In the description of the embodiments of the present application, the technical terms “first”, “second”, etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B may include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counter-clockwise", "axial", "radial", "circumferential", etc. are based on the orientation or position relationship shown in the accompanying drawings and are merely intended to facilitate and simplify the description of the embodiments of the present application, rather than indicating or implying that the device or element referred to must have a particular orientation or be configured and operated in a particular orientation, and therefore not to be construed as limiting the embodiments of the present application.

In the description of the embodiments of the present application, unless otherwise explicitly specified and defined, the technical terms such as "mount", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be internal communication between two elements or interaction between the two elements. For those of ordinary skill in the art, the specific meanings of the above terms in the embodiments of the present application can be understood according to specific situations.

In the existing energy storage device, when a wire harness is connected to a battery, there is a large gap at the connection between a wire harness cover and a battery case, so that rainwater will directly flow into the wire harness cover or the battery case through the gap. In the present application, the battery case is provided with a boss having an outward protruding portion, and the wire harness cover is internally provided with a recess in which the outward protruding portion can be accommodated. In this way, the wire harness cover can encase the portion connected to the boss, so as to prevent rainwater from directly flowing into the wire harness cover or the battery case.

A waterproof assembly of an energy storage device disclosed in the embodiments of the present application can, but is not limited to, be used in an energy storage device, but can also be used in a battery and in a power consuming device using a battery as a power source. The energy storage device is a device for storing electrical energy, and includes a cabinet frame and a battery. The power consuming device may be, but is not limited to, a mobile phone, a tablet, a notebook computer, an electric toy, an electric tool, a battery cart, an electric vehicle, a ship, a spacecraft, etc. The electric toy may include a stationary or mobile electric toy, such as a game console, an electric vehicle toy, an electric ship toy, and an electric airplane toy. The spacecraft may include an airplane, a rocket, a space shuttle, a spaceship, etc.

In the following embodiments, for ease of illustration, an example in which an energy storage device 1000 according to an embodiment of the present application is taken for description.

Referring to FIG. 1, FIG. 1 is a schematic structure diagram of an energy storage device 1000 according to some embodiments of the present application. The energy storage device 1000 is internally provided with a battery 100 and a cabinet frame 200. The battery 100 may be arranged on the cabinet frame 200. A plurality of batteries 100 may be stacked from top to bottom between cabinet frames 200.

Figure 2:
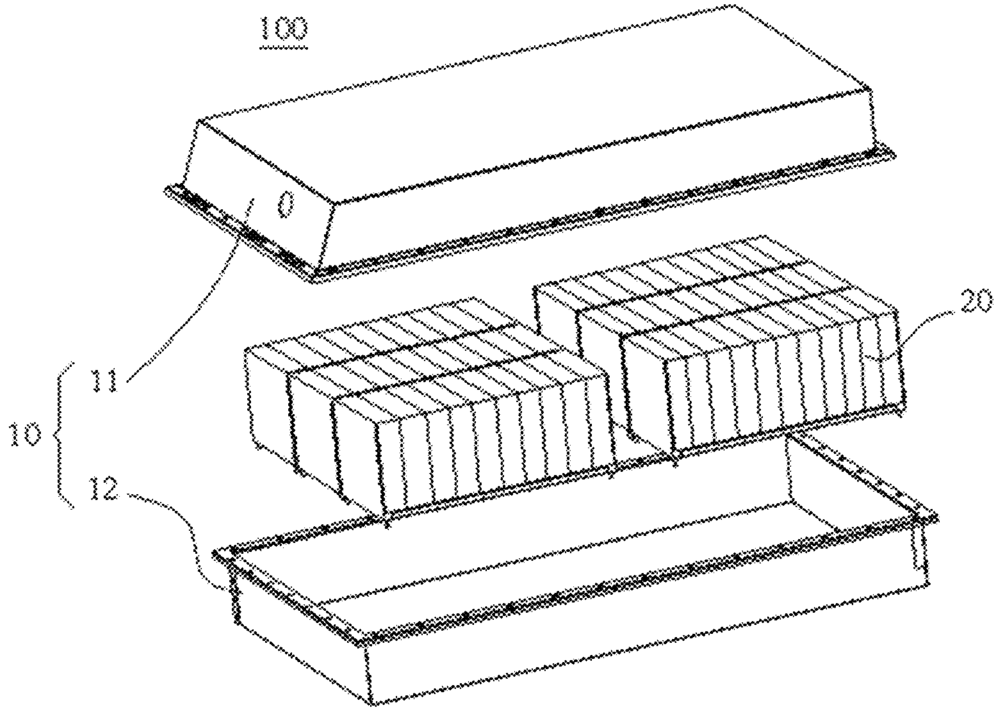
FIG. 2 is a schematic exploded structure view of a battery according to some embodiments of the present application.

Referring to FIG. 2, FIG. 2 is an exploded view of a battery 100 according to some embodiments of the present application. The battery 100 includes a case 10 and a battery cell 20. The battery cell 20 is accommodated in the case 10. The case 10 is configured to provide an accommodating space for the battery cell 20, and the case 10 may be of various structures. In some embodiments, the case 10 may include a first portion 11 and a second portion 12. The first portion 11 and the second portion 12 are fitted to each other in a covering manner, and the first portion 11 and the second portion 12 jointly define the accommodating space for accommodating the battery cell 20. The second portion 12 may be of a hollow structure with one end open, the first portion 11 may be of a plate-like structure, and the first portion 11 covers an open side of the second portion 12 such that the first portion 11 and the second portion 12 jointly define the accommodating space; and the first portion 11 and the second portion 12 may also each be of a hollow structure with one side open, and the open side of the first portion 11 covers the open side of the second portion 12. Of course, the case 10 formed by the first portion 11 and the second portion 12 may be in various shapes, such as a cylinder and a cuboid.

In the battery 100, a plurality of battery cells 20 may be provided. The plurality of battery cells 20 may be in series connection, in parallel connection, or in parallel-series connection. The parallel-series connection means that some of the plurality of battery cells 20 are connected in series and some are connected in parallel. The plurality of battery cells 20 may be directly connected together in series, or in parallel, or in series-parallel, and then a whole composed of the plurality of battery cells 20 is accommodated in the case 10. Of course, the battery 100 may also be a unit accommodated in the case 10 that is formed by firstly connecting a plurality of battery cells 20 in series or in parallel or in series-parallel to form a plurality of battery modules, and then connecting the plurality of battery modules in series or in parallel or in series-parallel. The battery 100 may further include other structures. For example, the battery 100 may further include a busbar component configured to achieve electrical connections between the multiple battery cells 20.

The battery cell 20 may be a secondary battery or a primary battery, and may be a lithium-sulfur battery, a sodium-ion battery, or a magnesium-ion battery, but is not limited thereto. The battery cell 20 may be in the shape of a cylinder, a flat body, a cuboid, etc.

Figure 3:
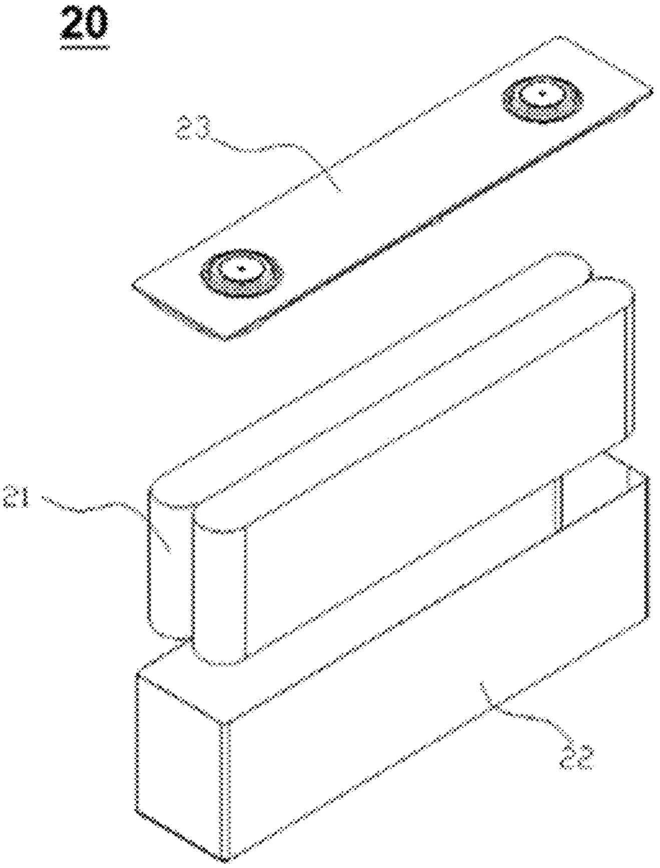
FIG. 3 is a schematic exploded structure view of a battery cell according to some embodiments of the present application.

Referring to FIG. 3, FIG. 3 is a schematic exploded view of a battery cell 20 according to some embodiments of the present application. As shown in FIG. 3, the battery cell 20 may include an electrode assembly 21, a shell 22, an end cap 23, and an electrolyte (not shown in the figure). The electrode assembly 21 may include a positive electrode plate, a negative electrode plate, and a separator (none is shown in the figure). The battery cell 20 works primarily by moving metal ions between the positive electrode plate and the negative electrode plate. The positive electrode plate includes a positive current collector and a positive active material layer. A surface of the positive current collector is coated with the positive active material layer. The positive current collector includes a positive current collecting portion coated with the positive active material layer. Taking a lithium-ion battery as an example, the positive current collector may be made of aluminum, and the positive active material layer includes a positive active material which may be lithium cobalt oxides, lithium iron phosphate, ternary lithium, lithium manganate, etc. The negative electrode plate includes a negative current collector and a negative active material layer. A surface of the negative current collector is coated with the negative active material layer. The negative collector includes a negative current collecting portion coated with the negative active material layer. The negative current collector may be made of copper, and the negative active material layer includes a negative active material which may be carbon, silicon, etc. The separator may be made of polypropylene (PP), polyethylene (PE), etc. In addition, the electrode assembly 21 may be of a wound structure or a laminated structure, but the embodiments of the present application are not limited thereto. The shell 22 may have an opening at one end or have openings at both ends. The end cap 23 covers the opening of the shell 22 to form, together with the shell 22, an accommodating space for accommodating the electrode assembly 21 and the electrolyte. Optionally, the shell 22 and the end cap 23 can be made of the same material, for example, the shell 22 and the end cap 23 can be both made of aluminum, so that the shell 22 and the end cap 23 can be welded conveniently. Alternatively, the shell 22 and the end cap 23 can also be made of different materials, for example, the shell 22 and the end cap 23 can be made of different metals, and the shell 22 and the end cap 23 can be connected by riveting or other manners.

Figure 4:
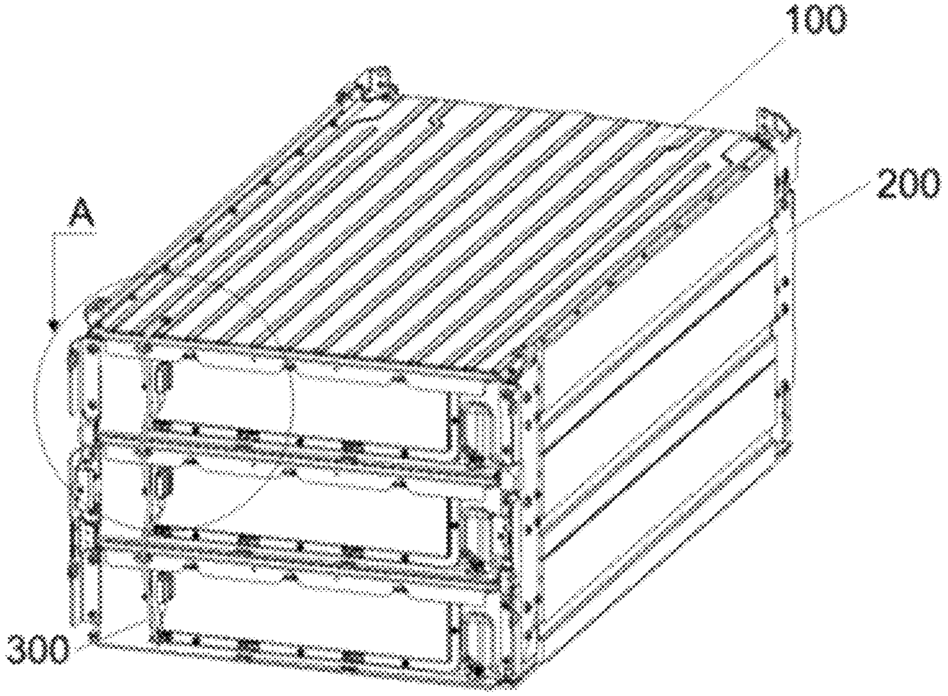
FIG. 4 is a schematic partial view of an energy storage device according to some embodiments of the present application.
Figure 5:
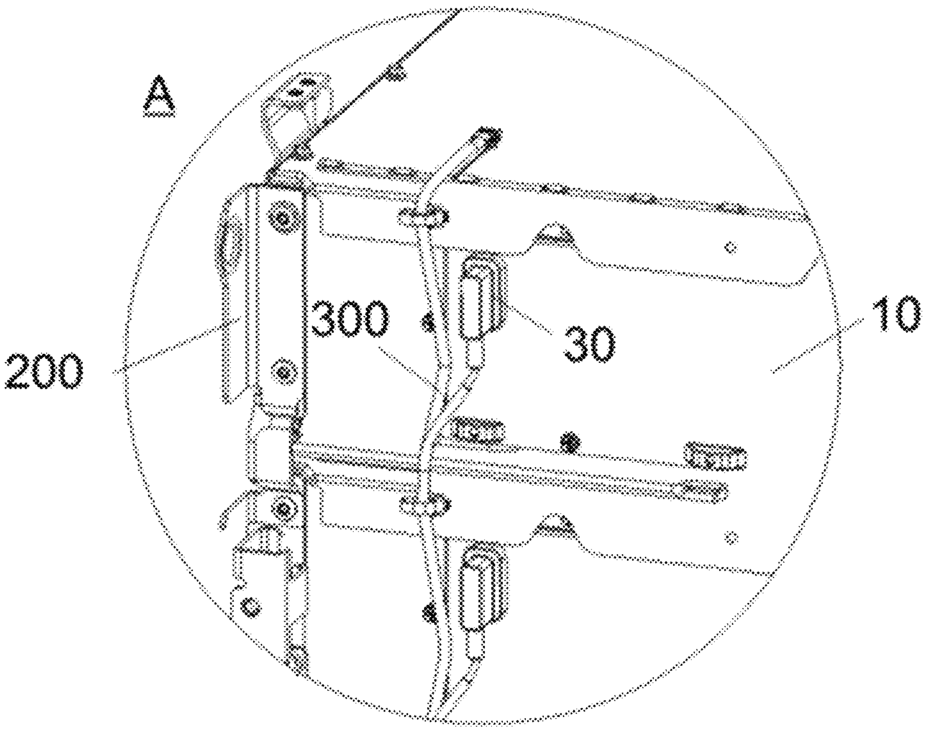
FIG. 5 is an enlarged view of region A in FIG. 4.

Referring to FIGS. 4 and 5, FIG. 4 is a schematic partial view of an energy storage device 1000 according to some embodiments of the present application, and FIG. 5 is an enlarged view of region A in FIG. 4. As shown in FIG. 4, a plurality of batteries 100 are stacked in a space formed by a plurality of cabinet frames 200, and the plurality of batteries 100 are electrically connected to each other by means of wire harnesses 300. As shown in FIG. 5, a wire harness cover 30 is arranged on a case 10 of a battery, and the wire harness 300 passes through the wire harness cover 30 and is electrically connected to the battery 100 inside the case 10.

Figure 6:
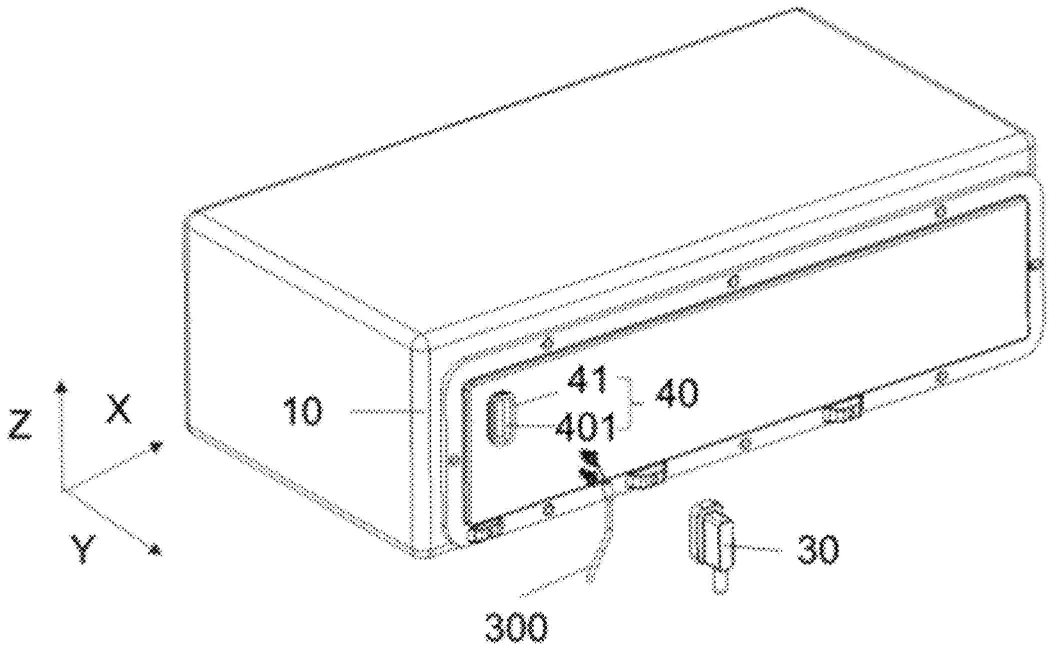
FIG. 6 is an exploded view of a waterproof assembly according to some embodiments of the present application.
Figure 7:
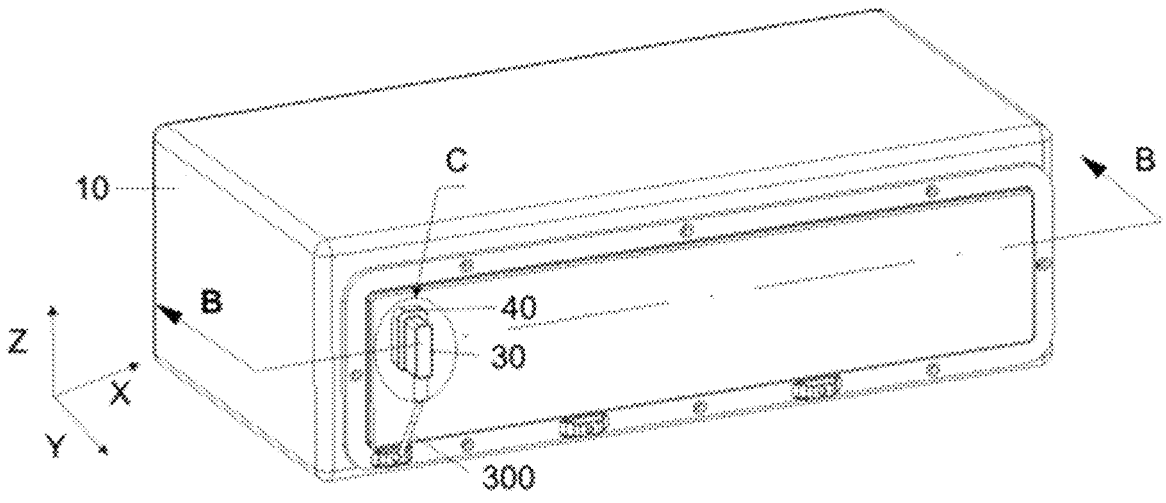
FIG. 7 is a schematic diagram of connection between a single wire harness cover and a battery case according to some embodiments of the present application.
Figure 8:
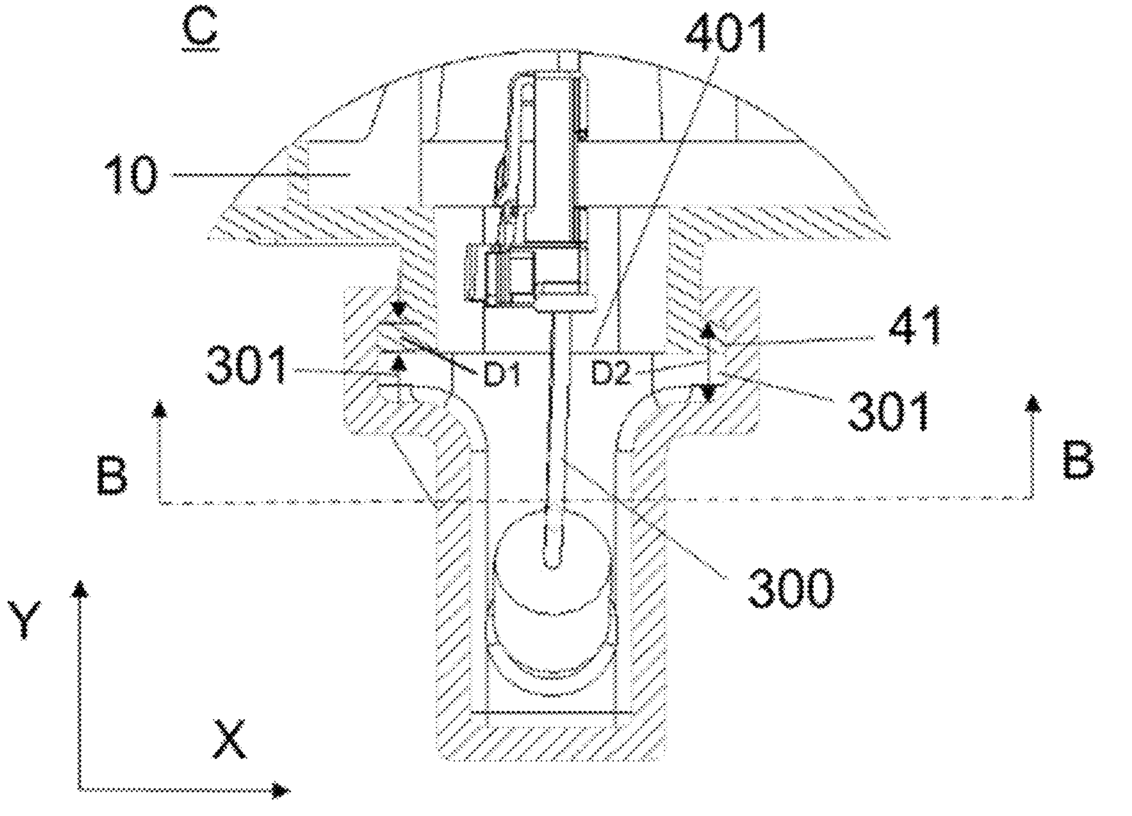
FIG. 8 is a schematic cross-sectional structure view of region C in FIG. 7 in direction B-B.

Referring to FIGS. 6 to 8, FIG. 6 is an exploded view of a waterproof assembly according to some embodiments of the present application, FIG. 7 is a schematic diagram of connection between a single wire harness cover 30 and a battery case 10 according to some embodiments of the present application, and FIG. 8 is a schematic cross-sectional structure view of region C in FIG. 7 in direction B-B. According to some embodiments of the present application, the present application provides a waterproof assembly of the energy storage device 1000. The waterproof assembly includes a boss 40 and a wire harness cover 30. The boss 40 is arranged on an outer wall of a case 10 of a battery, the boss 40 includes a first outward protruding portion 41, the first outward protruding portion 41 defines a first through hole 401, and the first through hole 401 is in communication with the interior of the case 10. The wire harness cover 30 is configured as a hollow cavity structure for receiving a wire harness 300, the wire harness cover 30 internally includes a first recess 301, and the first recess 301 is configured to accommodate the first outward protruding portion 41 to communicate the first through hole 401 with the hollow cavity.

The boss 40 is arranged on the outer wall of the case 10 and configured to be connected to the wire harness cover 30. The boss 40 may be made of metal such as iron, magnesium or aluminum, or engineering plastic such as polybutylece terephthalate (PBT). The interior of the boss 40 may be of a hollow pipe structure to facilitate electrical connection between the wire harness 300 and the battery 100 through the hollow pipe of the boss 40. The exterior of the boss 40 may be of a simple geometric structure such as a cuboid, a cylinder, or a sphere, or may be a complex geometric structure composed of a cuboid, a cylinder, a sphere, or other simple geometric structures.

The boss 40 includes a first outward protruding portion 41, the first outward protruding portion 41 may be arranged at an end of the boss 40 opposite to a side wall of the case 10 and extend toward an edge of the case 10 in a radial direction X of the boss 40.

The first outward protruding portion 41 extends around the periphery of the boss 40 and internally defines a first through hole 401. The first through hole 401 may be in communication with the interior of the case 10 so as to allow the wire harness 300 to be electrically connected to the battery 100 through the first through hole 401.

The wire harness cover 30 may be configured to be of a hollow cavity structure for receiving the wire harness 300. The exterior of the wire harness cover 30 may be of a simple geometric structure such as a cuboid, a cylinder or a sphere, or may be a complex geometric structure composed of a cuboid, a cylinder, a sphere or other simple geometric structures. The wire harness cover 30 may be made of metal such as iron, magnesium or aluminum, or engineering plastic such as PBT, or an elastic material such as rubber.

The case 10 is provided with the boss 40 having the first outward protruding portion 41, and the wire harness cover 30 is internally provided with the first recess 301 in which the first outward protruding portion 41 can be accommodated. In this way, the wire harness cover 30 may encase the portion connected to the boss 40 so as to prevent rainwater from directly flowing into the wire harness cover 30 or the case 10, thereby improving the waterproof performance of the energy storage device 1000.

According to some embodiments of the present application, optionally, the first outward protruding portion 41 is in interference-fit with the first recess 301 in an axial direction Y of the boss 40.

The first outward protruding portion 41 is in interference-fit with the first recess 301 in the axial direction Y of the boss 40, that is, the diameter D1 of the outer side wall of the first outward protruding portion 41 in the axial direction is greater than the diameter D2 of the inner side wall of the first recess 301. The interference-fit means that, during a mechanical installation process, when parts need to fit closely together, under the action of the elasticity of material, the first recess 301 expands and deforms to sleeve on the first outward protruding portion 41, and then the first recess 301 is restored and applies a hooping force to the first outward protruding portion 41, so that the first outward protruding portion 41 fits closely with the first recess 301.

The interference-fit connection is simple in structure, has little weakening effect on the strength of the first outward protruding portion 41 and the first recess 301, and has good impact resistance. Since the outer side wall of the first outward protruding portion 41 is in interference-fit with the inner wall of the first recess 301, the sealing performance of the wire harness cover 30 to the boss 40 is greatly improved.

Figure 9:
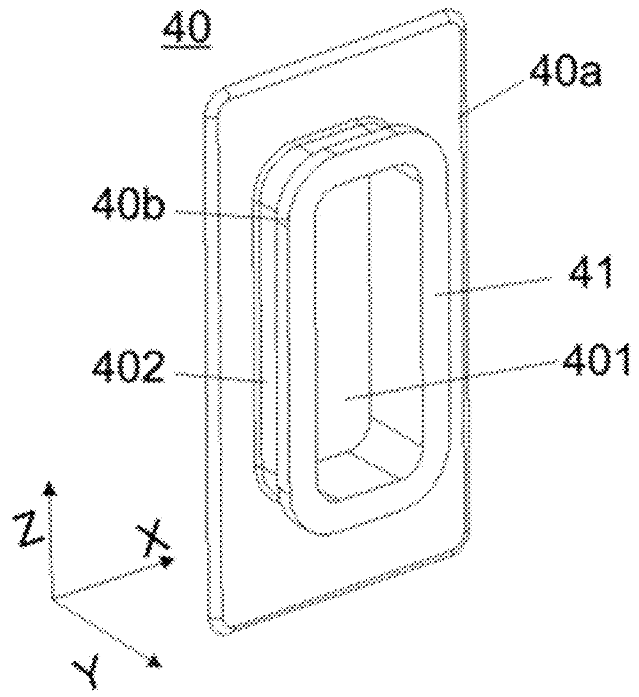
FIG. 9 is a schematic structure diagram of a boss according to some embodiments of the present application.
Figure 10:
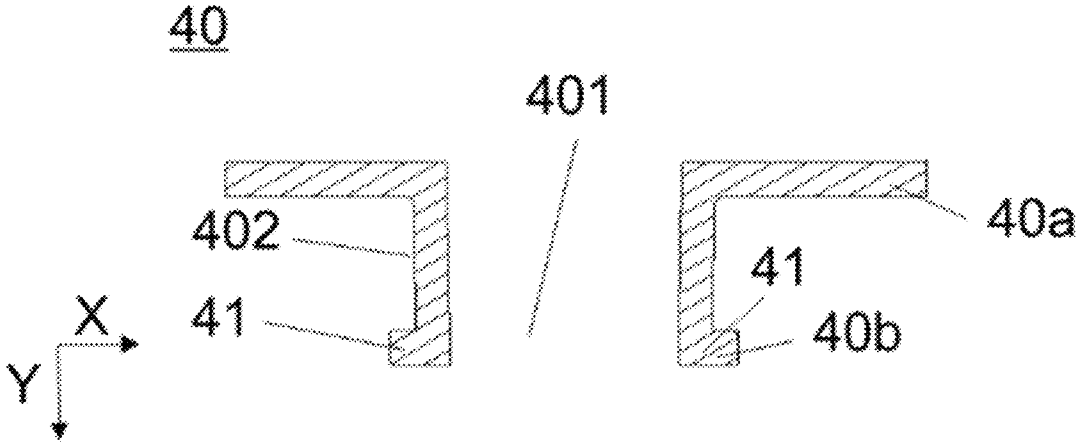
FIG. 10 is a schematic cross-sectional structure view of the boss shown in FIG. 9 in plane X-Y.

Referring to FIGS. 9 and 10, FIG. 9 is a schematic structure diagram of a boss 40 according to some embodiments of the present application, and FIG. 10 is a schematic cross-sectional structure view of the boss 40 shown in FIG. 9 in plane X-Y. According to some embodiments of the present application, optionally, the boss 40 includes a first end 40*a* and a second end 40*b*. The first end 40*a* is connected to a side wall of the case 10. The second end 40*b* is arranged opposite the first end 40*a*, and the second end 40*b* is provided with the first outward protruding portion 41. A second recess 402 is formed between the first end 40*a* and the first outward protruding portion 41, and the second recess 402 is configured to accommodate a portion of the wire harness cover 30.

The boss 40 is provided with the second recess 402 to accommodate a portion of the wire harness cover 30 when the first outward protruding portion 41 is accommodated in the first recess 301, so that the sealing performance of the wire harness cover 30 to the boss 40 can be enhanced.

Figure 11:
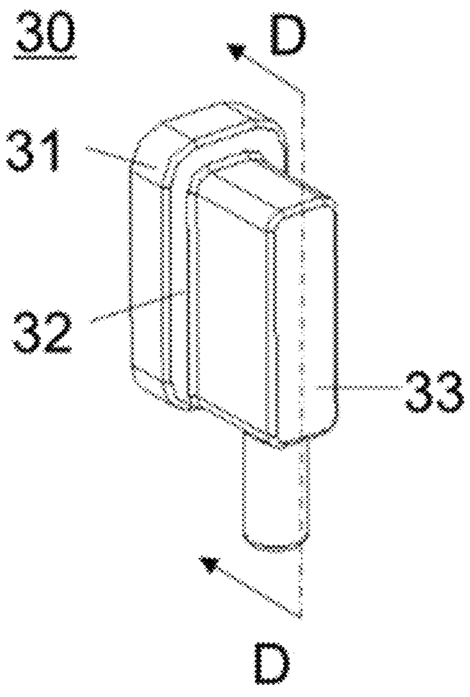
FIG. 11 is a schematic structure diagram of a wire harness cover according to some embodiments of the present application.
Figure 12:
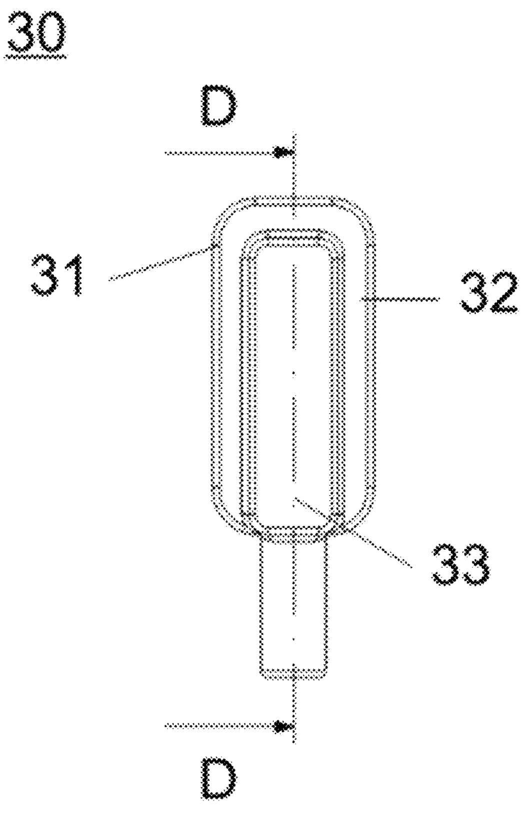
FIG. 12 is a front view of the wire harness cover shown in FIG. 11.
Figure 13:
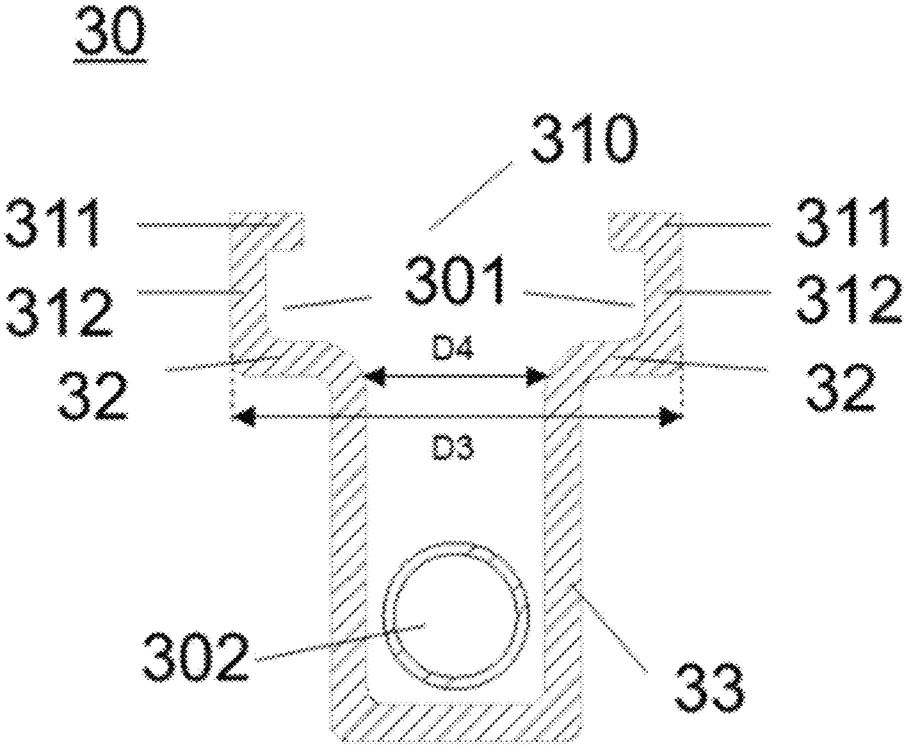
FIG. 13 is a schematic cross-sectional structure view of the wire harness cover shown in FIG. 11 from a top view.
Figure 14:
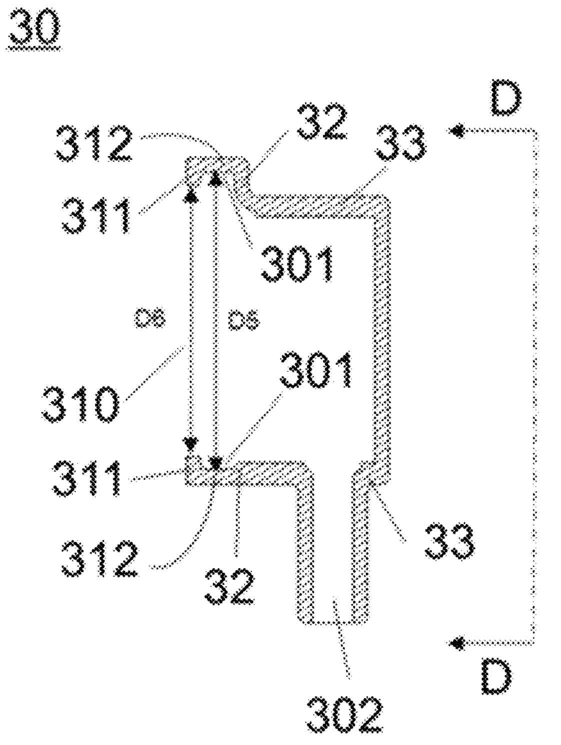
FIG. 14 is a schematic cross-sectional structure view of the wire harness cover shown in FIG. 11 in direction D-D.

Referring to FIGS. 11 to 14, FIG. 11 is a schematic structure diagram of a wire harness cover 30 according to some embodiments of the present application, FIG. 12 is a front view of the wire harness cover 30 shown in FIG. 11, FIG. 13 is a schematic cross-sectional structure view of the wire harness cover 30 shown in FIG. 11 from a top view, and FIG. 14 is a schematic cross-sectional structure view of the wire harness cover 30 shown in FIG. 11 in direction D-D. According to some embodiments of the present application, optionally, the wire harness cover 30 includes a mouth portion 31, a transition portion 32, and a tail portion 33. The mouth portion 31 is located at one end of the wire harness cover 30 connected to the boss 40, the mouth portion 31 is provided with an opening 310, and the first outward protruding portion 41 enters the hollow cavity of the wire harness cover 30 through the opening 310. The tail portion 33 is located at the other end of the wire harness cover 30, the tail portion 33 includes a second through hole 302, and the wire harness 300 enters the hollow cavity of the wire harness cover 30 through the second through hole 302. The transition portion 32 connects the mouth portion 31 with the tail portion 33, and the outer diameter D3 of one end of the transition portion 32 connected to the mouth portion 31 is greater than the outer diameter D4 of one end of the transition portion 32 connected to the tail portion 33.

The mouth portion 31 is located at one end of the wire harness cover 30 connected to the boss 40 and configured to be connected to the boss 40. The mouth portion 31 may be provided with an opening 310, and the first outward protruding portion 41 enters the hollow cavity of the wire harness cover 30 through the opening 310 and is accommodated in the first recess 301. The mouth portion 31 may be made of engineering plastic such as PBT, or an elastic material such as rubber.

The tail portion 33 is located at the other end of the wire harness cover 30 opposite to the mouth portion 31. The tail portion 33 may include a second through hole 302, and the wire harness 300 may enter the hollow cavity of the wire harness cover 30 through the second through hole 302, and then enter the first through hole 401 through the mouth portion 31 and is connected to the battery 100.

The transition portion 32 is configured to connect the mouth portion 31 with the tail portion 33. As shown in FIG. 13, the outer diameter D3 of one end of the transition portion 32 connected to the mouth portion 31 is greater than the outer diameter D4 of one end of the transition portion 32 connected to the tail portion 33.

The wire harness cover 30 is configured such that the outer diameter D4 of the tail portion 33 is smaller than the outer diameter D3 of the mouth portion 31, so that the volume of the tail portion 33 can be reduced, and accordingly, the wire harness cover 30 occupies less volume of the energy storage device 1000, thereby increasing the energy density of the energy storage device 1000.

Referring to FIGS. 13 and 14, according to some embodiments of the present application, optionally, the mouth portion 31 includes an opening section 311 and a connecting section 312. The opening section 311 is located at one end of the mouth portion 31 connected to the boss 40. The connecting section 32 is located at the other end of the mouth portion 31 and configured to connect the opening section 311 with the transition portion 32. The inner diameter D5 of the connecting section 312 is greater than the inner diameter D6 of the opening section 311, and the opening section 311, the connecting section 312 and the transition portion 32 jointly form the first recess 301.

Figure 15:
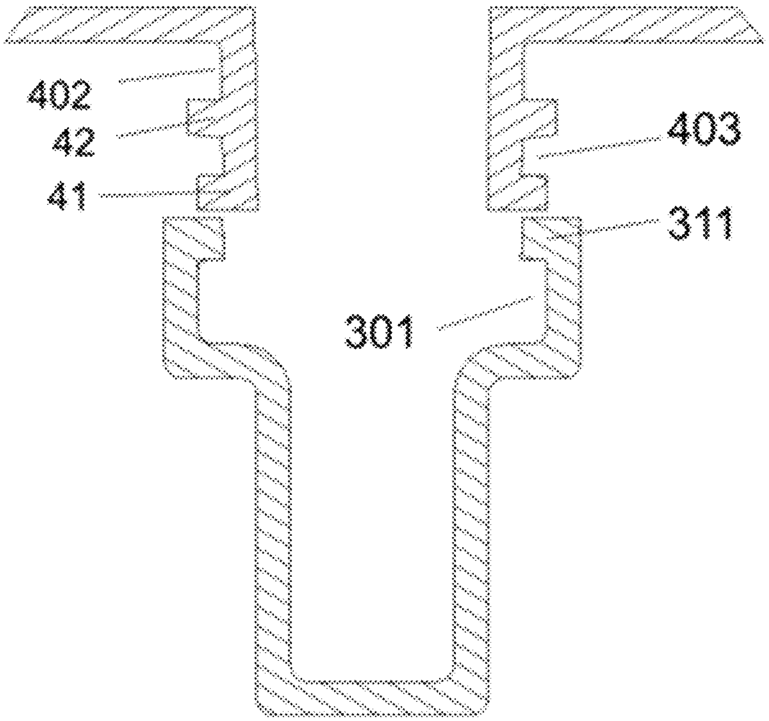
FIG. 15 is a schematic partial cross-sectional structure view of a wire harness cover and a boss according to some embodiments of the present application.

Referring to FIG. 15, FIG. 15 is a schematic partial cross-sectional structure view of a wire harness cover 30 and a boss 40 according to some embodiments of the present application. According to some embodiments of the present application, optionally, the boss 40 further includes a second outward protruding portion 42, the second outward protruding portion 42 is located in the second recess 402, the second outward protruding portion 42 and the first outward protruding portion 41 form a third recess 403, and the third recess 403 is configured to accommodate at least a portion of the opening section 311 when the first outward protruding portion 41 is accommodated in the first recess 301, the at least a portion of the opening section 311 being in interference-fit with the third recess 403.

The boss 40 is additionally provided with the third recess 403, and at least a portion of the opening section 311 is in interference-fit with the third recess 403, so that the sealing performance of the wire harness cover 30 to the boss 40 can be improved.

Figure 16:
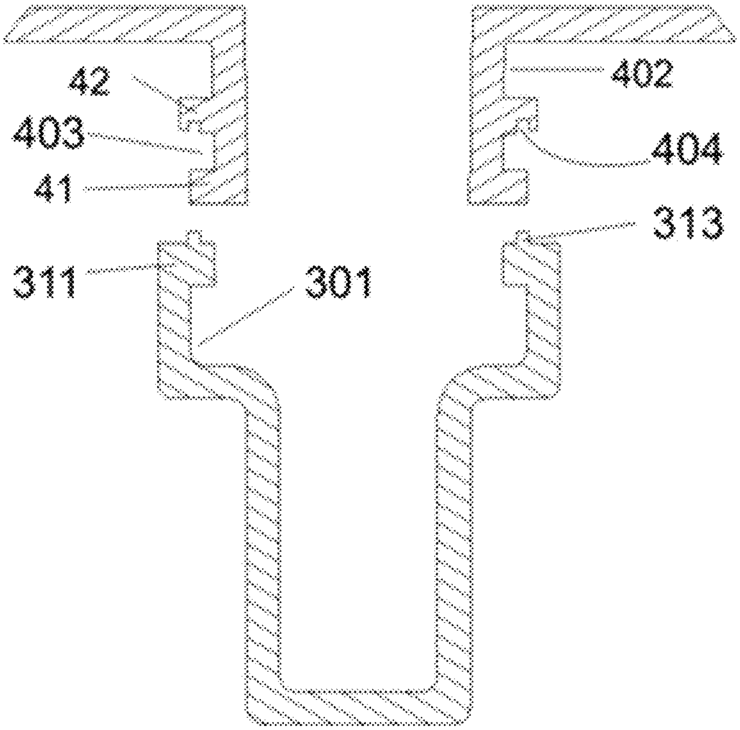
FIG. 16 is a schematic partial cross-sectional structure view of another wire harness cover and another boss according to some embodiments of the present application.

Referring to FIG. 16, FIG. 16 is a schematic partial cross-sectional structure view of another wire harness cover 30 and another boss 40 according to some embodiments of the present application. Optionally, according to some embodiments of the present application, a portion of the opening section 311 in contact with the second outward protruding portion 42 is provided with a third outward protruding portion 313 extending toward the first end 40*a*, and the second outward protruding portion 42 is provided with a fourth recess 404 matching the third outward protruding portion 313 in shape.

The boss 40 is additionally provided with the fourth recess 404, and the wire harness cover 30 is provided with the third outward protruding portion 313 matching the fourth recess 404, so that the sealing performance of the wire harness cover 30 to the boss 40 can be improved.

Figure 17:
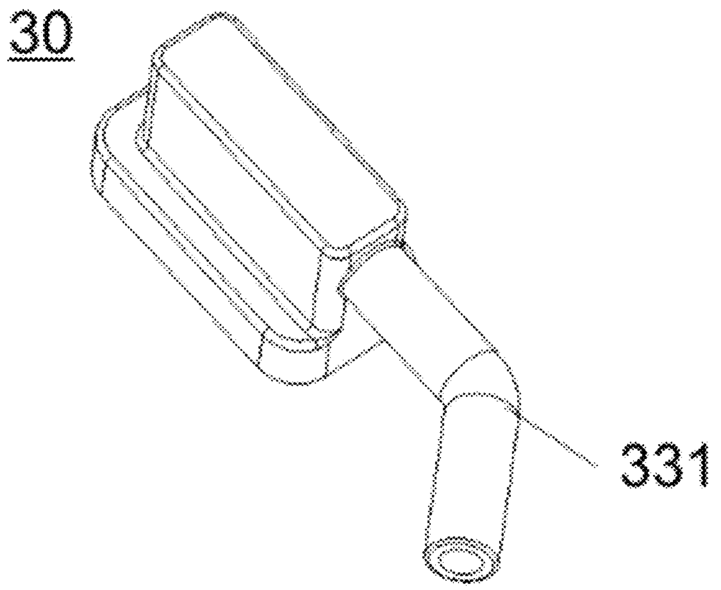
FIG. 17 is a schematic structure diagram of a wire harness cover including a bent tail pipe according to some embodiments of the present application.

Referring to FIG. 17, FIG. 17 is a schematic structure diagram of a wire harness cover 30 including a bent tail pipe 331 according to some embodiments of the present application. According to some embodiments of the present application, optionally, the tail portion 33 includes a bent tail pipe 331, and an inner cavity of the bent tail pipe 331 is in communication with the second through hole 302.

The bent tail pipe 331 prevents rainwater from directly flowing into the wire harness cover 30 from the second through hole 302, thereby enhancing the rainproof performance of the wire harness cover 30.

According to some embodiments of the present application, optionally, the material of the wire harness cover 30 includes rubber.

Rubber has good elasticity, and the connection between the wire harness cover 30 and the boss 40 can be made of rubber to improve the sealing performance of the wire harness cover 30.

According to some embodiments of the present application, a waterproof assembly of the energy storage device 1000 provided in the present application includes a boss 40 and a wire harness cover 30. The boss 40 includes a first outward protruding portion 41, the first outward protruding portion 41 defines a first through hole 401, and the wire harness cover 30 internally includes a first recess 301. The first outward protruding portion 41 is in interference-fit with the first recess 301 in an axial direction of the boss 40. The boss 40 further includes a second recess 402, a third recess 403, a fourth recess 404, and a second outward protruding portion 42. The wire harness cover 30 includes a mouth portion 31, a transition portion 32 and a tail portion 33. The mouth portion 31 is provided with an opening 310, the mouth portion 31 includes an opening section 311 and a connecting section 312, and the opening section 311 is provided with a third outward protruding portion 313. The tail portion 33 includes a bent tail pipe 331, and an inner cavity of the bent tail pipe 331 forms the second through hole 302. The outer diameter D3 of one end of the transition portion 32 connected to the mouth portion 31 is greater than the outer diameter D4 of one end of the transition portion 32 connected to the tail portion 33. The mouth portion 31 of the wire harness cover 30 is made of rubber, the transition portion 32 and the tail portion 33 are made of PBT, and the boss 40 is made of metal aluminum.

In a second aspect of the present application, an energy storage device 1000 is provided, which includes a battery 100, a wire harness 300, and a waterproof assembly of any of the embodiments provided in the first aspect of the present application. The waterproof assembly is used to implement a waterproof function at the connection between the wire harness 300 and the battery 100.

According to some embodiments of the present application, the energy storage device 1000 provided in the second aspect of the present application has a feature of good rainproof effect.

Finally, it should be noted that the foregoing embodiments are merely used for illustrating rather than limiting the technical solutions of the present application. Although the present application has been illustrated in detail with reference to the above embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A waterproof assembly of an energy storage device, the waterproof assembly comprising:
- a boss, which is arranged on an outer wall of a case of a battery and comprises a first outward protruding portion that defines a first through hole in communication with an interior of the case; and
- a wire harness cover, which is configured to be of a hollow cavity structure for receiving a wire harness and is internally provided with a first recess that is configured to accommodate the first outward protruding portion to communicate the first through hole with the hollow cavity;
- wherein the boss comprises:
  - a first end, which is connected to a side wall of the case; and
  - a second end, which is arranged opposite the first end and is provided with the first outward protruding portion;
  - wherein a second recess is formed between the first end and the first outward protruding portion and is configured to accommodate an opening section of the wire harness cover;
- wherein the wire harness cover comprises:
  - a mouth portion, which is located at one end of the wire harness cover connected to the boss and is provided with an opening through which the first outward protruding portion enters the hollow cavity of the wire harness cover, wherein the first outward protruding portion extends outward in a radial direction and the opening section extends inward in the radial direction to overlap and interlock with the first outward protruding portion in an axial direction perpendicular to the radial direction;
  - a tail portion, which is located at the other end of the wire harness cover and comprises a second through hole through which the wire harness enters the hollow cavity of the wire harness cover; and
  - a transition portion, which connects the mouth portion with the tail portion, the outer diameter of one end of the transition portion connected to the mouth portion being greater than the outer diameter of one end of the transition portion connected to the tail portion; and
  - wherein the tail portion comprises a bent tail pipe, and an inner cavity of the bent tail pipe is in communication with the second through hole.

2. The waterproof assembly according to claim 1, wherein;
- the first outward protruding portion is in interference-fit with the first recess in the axial direction of the boss.

3. The waterproof assembly according to claim 1, wherein the mouth portion comprises:
- the opening section, which is located at one end of the mouth portion connected to the boss; and a connecting section, which is located at the other end of the mouth portion and configured to connect the opening section with the transition portion;

wherein the inner diameter of the connecting section is greater than the inner diameter of the opening section; and the opening section, the connecting section and the transition portion jointly form the first recess.

4. The waterproof assembly according to claim 3, wherein:

the boss comprises a second outward protruding portion that is located in the second recess; and the second outward protruding portion and the first outward protruding portion form a third recess that is configured to accommodate at least a portion of the opening section when the first outward protruding portion is accommodated in the first recess, the at least a portion of the opening section being in interference-fit with the third recess.

5. The waterproof assembly according to claim 4, wherein;

a portion of the opening section in contact with the second outward portion is provided with a third outward protruding portion extending toward the first end, and the second outward protruding portion is provided with a fourth recess matching the third outward protruding portion.

6. The waterproof assembly according to claim 1, wherein:

a material of the wire harness cover includes rubber.

7. The waterproof assembly according to claim 1, wherein:

an outer side wall of the first outward protruding portion is in interference-fit with an inner wall of the opening section of the wire harness cover, such that a continuous boss surface of the first outward protruding portion contacts a continuous wire harness cover surface of the opening section in the radial direction.

8. The waterproof assembly according to claim 7, wherein:

the first recess includes an inner side wall that applies a radial hooping force to the outer side wall of the first outward protruding portion to form the interference-fit.

9. The waterproof assembly according to claim 1, wherein:

the tail portion extends along a longitudinal axis of the wire harness cover, and a bent tail pipe angle is less than 90 degrees with respect to the longitudinal axis.

10. The waterproof assembly according to claim 9, wherein:

the bent tail pipe angle is between 30 and 60 degrees with respect to the longitudinal axis.

11. The waterproof assembly according to claim 9, wherein:

the bent tail pipe angle is between 40 and 50 degrees with respect to the longitudinal axis.

12. An energy storage device, comprising:

a battery;

a wire harness; and a waterproof assembly for implementing a waterproof function at a connection between the wire harness and the battery, the waterproof assembly including:

a boss, which is arranged on an outer wall of a case of the battery and comprises a first outward protruding portion that defines a first through hole in communication with an interior of the case; and a wire harness cover, which is configured to be of a hollow cavity structure for receiving the wire harness and is internally provided with a first recess that is configured to accommodate the first outward protruding portion to communicate the first through hole with the hollow cavity;

wherein the boss comprises:

a first end, which is connected to a side wall of the case; and a second end, which is arranged opposite the first end and is provided with the first outward protruding portion;

wherein a second recess is formed between the first end and the first outward protruding portion and is configured to accommodate an opening section of the wire harness cover:

wherein the wire harness cover comprises:

a mouth portion, which is located at one end of the wire harness cover connected to the boss and is provided with an opening through which the first outward protruding portion enters the hollow cavity of the wire harness cover, wherein the first outward protruding portion extends outward in a radial direction and the opening section extends inward in the radial direction to overlap and interlock with the first outward protruding portion in an axial direction perpendicular to the radial direction;

a tail portion, which is located at the other end of the wire harness cover and comprises a second through hole through which the wire harness enters the hollow cavity of the wire harness cover; and a transition portion, which connects the mouth portion with the tail portion, the outer diameter of one end of the transition portion connected to the mouth portion being greater than the outer diameter of one end of the transition portion connected to the tail portion; and wherein the tail portion comprises a bent tail pipe, and an inner cavity of the bent tail pipe is in communication with the second through hole.

13. The energy storage device according to claim 12, wherein:

an outer side wall of the first outward protruding portion is in interference-fit with an inner wall of the opening section of the wire harness cover, such that a continuous boss surface of the first outward protruding portion contacts a continuous wire harness cover surface of the opening section in the radial direction.

14. The energy storage device according to claim 13, wherein:

the first recess includes an inner side wall that applies a radial hooping force to the outer side wall of the first outward protruding portion to form the interference-fit.

15. The energy storage device according to claim 12, wherein:

the tail portion extends along a longitudinal axis of the wire harness cover, and a bent tail pipe angle is less than 90 degrees with respect to the longitudinal axis.

16. The energy storage device according to claim 15, wherein:

the bent tail pipe angle is between 30 and 60 degrees with respect to the longitudinal axis.

17. The energy storage device according to claim 15, wherein:

the bent tail pipe angle is between 40 and 50 degrees with respect to the longitudinal axis.

18. A waterproof assembly of an energy storage device, the waterproof assembly comprising:

a boss, which is arranged on an outer wall of a case of a battery and comprises a first outward protruding portion that defines a first through hole in communication with an interior of the case; and a wire harness cover, which is configured to be of a hollow cavity structure for receiving a wire harness and is internally provided with a first recess that is configured to accommodate the first outward protruding portion to communicate the first through hole with the hollow cavity;

wherein the boss comprises:

a first end, which is connected to a side wall of the case; and a second end, which is arranged opposite the first end and is provided with the first outward protruding portion;

wherein a second recess is formed between the first end and the first outward protruding portion and is configured to accommodate an opening section of the wire harness cover;

wherein the wire harness cover comprises:

a mouth portion, which is located at one end of the wire harness cover connected to the boss and is provided with an opening through which the first outward protruding portion enters the hollow cavity of the wire harness cover, wherein the first outward protruding portion extends outward in a radial direction and the opening section extends inward in the radial direction to overlap and interlock with the first outward protruding portion in an axial direction perpendicular to the radial direction;

a tail portion, which is located at the other end of the wire harness cover and comprises a second through hole through which the wire harness enters the hollow cavity of the wire harness cover; and a transition portion, which connects the mouth portion with the tail portion, the outer diameter of one end of the transition portion connected to the mouth portion being greater than the outer diameter of one end of the transition portion connected to the tail portion; and wherein the tail portion comprises a bent tail pipe, and an inner cavity of the bent tail pipe is in communication with the second through hole, and wherein:

an outer side wall of the first outward protruding portion is in interference-fit with an inner wall of the opening section of the wire harness cover, such that a continuous boss surface of the first outward protruding portion contacts a continuous wire harness cover surface of the opening section in the radial direction, and the first recess includes an inner side wall that applies a radial hooping force to the outer side wall of the first outward protruding portion to form the interference-fit.

19. The waterproof assembly according to claim 18, wherein:

the tail portion extends along a longitudinal axis of the wire harness cover, and a bent tail pipe angle is less than 90 degrees with respect to the longitudinal axis.

20. The waterproof assembly according to claim 19, wherein:

the bent tail pipe angle is between 40 and 50 degrees with respect to the longitudinal axis.

* * * * *